United States Patent
Whittaker et al.

(10) Patent No.: US 12,252,447 B2
(45) Date of Patent: Mar. 18, 2025

(54) MULTI-COMPONENT INORGANIC CAPSULE ANCHORING SYSTEM BASED ON GROUND-GRANULATED BLAST-FURNACE SLAG

(71) Applicant: Hilti Aktiengesellschaft, Schaan (LI)

(72) Inventors: Mark Whittaker, Landsberg am Lech (DE); Markus Schönlein, Gilching (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/997,702

(22) PCT Filed: May 6, 2021

(86) PCT No.: PCT/EP2021/062013
§ 371 (c)(1),
(2) Date: Nov. 1, 2022

(87) PCT Pub. No.: WO2021/228684
PCT Pub. Date: Nov. 18, 2021

(65) Prior Publication Data
US 2023/0167033 A1 Jun. 1, 2023

(30) Foreign Application Priority Data

May 15, 2020 (EP) .................... 20174879
May 15, 2020 (EP) .................... 20174882
May 15, 2020 (EP) .................... 20174887

(51) Int. Cl.
*C04B 40/06* (2006.01)
*C04B 7/153* (2006.01)
*C04B 14/06* (2006.01)
*C04B 28/08* (2006.01)
*C04B 40/00* (2006.01)

(52) U.S. Cl.
CPC ........ *C04B 40/0641* (2013.01); *C04B 7/1535* (2013.01); *C04B 14/06* (2013.01); *C04B 28/082* (2013.01); *C04B 40/0039* (2013.01)

(58) Field of Classification Search
CPC ............ C04B 40/0641; C04B 40/0039; C04B 7/1535; C04B 14/06; C04B 28/082
USPC ........................................ 106/789
See application file for complete search history.

(56) References Cited

U.S. PATENT DOCUMENTS

| 4,802,922 A | 2/1989 | Smart |
| 2011/0100262 A1 | 5/2011 | Ellenrieder et al. |

FOREIGN PATENT DOCUMENTS

| CN | 108975780 | | 12/2018 | | |
| DE | 19510307 | A1 * | 9/1996 | ......... | C04B 40/0666 |
| EP | 703197 | A2 * | 3/1996 | ............. | C04B 26/06 |
| EP | 1561736 | A1 * | 8/2005 | ............. | C04B 28/08 |
| JP | 2018087103 | A * | 6/2018 | | |
| WO | 2010/017571 | | 2/2010 | | |
| WO | 2018/189295 | | 10/2018 | | |

OTHER PUBLICATIONS

Bellmann et al. "Activation of blast furnace slag by a new method". Cement and Concrete Research 39 (2009) p. 644-650. (Year: 2009).*
Suresh et al. "Ground Granulated Blast Slag (GGBS) In Concrete—A Review", IOSR Journal of Mechanical and Civil Engineering, vol. 12, Iss. 4 (2015), pp. 76-82. (Year: 2015).*
Merriam-Webster, 2023. "Capsule". https://www.merriam-webster.com/dictionary/capsule (Year: 2023).*
Machine Translation of JP 2018087103 A. (Year: 2018).*
Machine Translation of DE 19510307 A1. (Year: 1996).*
International Search Report dated Jul. 22, 2021, in PCT/EP2021/062013, 3 pages.
Written Opinion dated Jul. 22, 2021, in PCT/EP2021/062013, 6 pages.
LangFang Zhang, "Alkali Activated Slag Cement and Concrete", Southwest Jiaotong University Press, 1st Edition, Aug. 31, 2018, p. 22, with English translation.
HVU2 Anchor capsule—Chemical Anchors—Hilti USA, printed May 7, 2024, from online website: https://www.hilti.com/c/CLS_FASTENER_7135/CLS_CHEMICAL_ANCHORS_7135/r10391268.
HVU2 Anchor capsule—Chemical Anchors—Hilti USA, Technical information, Anchor Fastening Technical guide, Edition 21, printed May 7, 2024, from online website: https://www.hilti.com/c/CLS_FASTENER_7135/CLS_CHEMICAL_ANCHORS_7135/r10391268.

* cited by examiner

*Primary Examiner* — Melissa S Swain
*Assistant Examiner* — Catriona M Corallo
(74) *Attorney, Agent, or Firm* — Grüneberg and Myers PLLC

(57) ABSTRACT

A multi-component inorganic capsule anchoring system can be used for chemical fastening of anchors, bolts, screw anchors, screw bolts, and post-installed reinforcing bars in mineral substrates. The multi-component inorganic capsule anchoring system contains a curable powdery ground-granulated blast-furnace slag-based component A, and an initiator component B in aqueous-phase for initiating the curing process. The powdery ground-granulated blast-furnace slag-based component A contains further silica dust. The component B contains an alkali- or alkaline earth-hydroxide, alkali- or alkaline earth-carbonate, or alkali- or alkaline earth-sulfate component.

20 Claims, No Drawings

MULTI-COMPONENT INORGANIC CAPSULE ANCHORING SYSTEM BASED ON GROUND-GRANULATED BLAST-FURNACE SLAG

CROSS-REFERENCE TO RELATED APPLICATIONS

This application is the National Stage entry under § 371 of International Application No. PCT/EP2021/062013, filed on May 6, 2021, and which claims the benefit of priority to each of European Application No. 20174879.5, filed on May 15, 2020; European Application No. 20174882.9, filed on May 15, 2020; and European Application No. 20174887.8, filed on May 15, 2020. The content of each of these applications is hereby incorporated by reference in its entirety.

BACKGROUND OF THE INVENTION

Field of the Invention

The present invention pertains to a multi-component inorganic capsule anchoring system for a chemical fastening of anchors, bolts, screw anchors, screw bolts and post-installed reinforcing bars in mineral substrates, comprising a curable powdery ground-granulated blast-furnace slag-based component A and an initiator component B in aqueous-phase for initiating the curing process, wherein the powdery ground-granulated blast-furnace slag-based component A comprises further silica dust, and wherein component B comprises an alkali- or alkaline earth-hydroxide, alkali- or alkaline earth-carbonate, or alkali- or alkaline earth-sulfate. Moreover, the present invention pertains to a method for a chemical fastening of anchoring means, preferably of metal anchors, bolts, screw anchors, screw bolts and post-installed reinforcing bars, in mineral substrates, such as structures made of brickwork, concrete, pervious concrete or natural stone using said multi-component inorganic capsule anchoring system.

DESCRIPTION OF RELATED ART

Many mortar systems exist which provide a good chemical fastening of anchors, bolts, screw anchors, screw bolts and post-installed reinforcing bars in mineral substrates or surfaces. Predominantly mineral systems based on aluminous cement or the like have been developed.

When it comes to chemical fastening of anchors, bolts, screw anchors, screw bolts and post-installed reinforcing bars in mineral substrates, most of the known systems lack in sufficient fluidity for most practical applications of the resultant anchoring compositions.

Moreover, liquid systems or systems in slurry form exist that have to be mixed prior to the introduction into the borehole making application difficult, in particular with respect to overhead or under water applications, as liquid mortar can drop out of the borehole or can liquefy due to the surrounding water or moist. Often such prior art compositions also evidence a tendency to crack in a relatively short time or do not exhibit the required mechanical performance, in particular under certain conditions such as under the influence of elevated temperatures, in different conditioned boreholes as well as over a long period of time. Moreover, known systems tend to exhibit a large extend of shrinkage when applied in a borehole which results in an insufficient anchoring of the anchors, bolts, screw anchors, screw bolts and post-installed reinforcing bars.

Therefore, there is a need for an inorganic capsule anchoring system, preferably a multi-component inorganic capsule anchoring system, which is superior over the prior art systems. In particular, it is of interest to provide a system that can be used for a chemical fastening of anchors, bolts, screw anchors, screw bolts and post-installed reinforcing bars in mineral substrates without adversely affecting the handling characteristics, in particular with respect to overhead applications, under water applications, and the mechanical performance of the chemical anchoring system. Especially, there is a need for a system that provides increased load values when compared to the known systems.

In addition, there is a need to improve load values by the addition of fillers or particles materials, such as an inorganic-based material, to lower the consumption of more expensive binder material or to improve some properties of the mixed material.

In addition to the above, there is a need to reduce harmful substances, e.g. cancerogenic, toxic, mutagenic or environmentally hazardous substances, in the anchoring system, such as peroxides, reactive diluents and resins, in order to improve the handling safety in production and for operators.

There is also an increased need for sustainable binders in fastening. The use of ground-granulated blast-furnace slag, which is a waste product of steel manufacturing, is more sustainable compared to using common Portland cements and has also a lower carbon footprint than synthetic resins. However, the pozzolanic reaction of ground-granulated blast-furnace slag cannot be activated by the simple addition of water and requires a certain degree of alkalinity.

Additionally, there is a need for improved shelf-life of anchoring mortars, especially with respect to mildew or oxidation, where organic systems are prone to. This can be avoided by using inorganic, alkaline binders, which do not need the addition of a biocide.

SUMMARY OF THE INVENTION

In view of the above, it is an object of the present invention to provide an inorganic capsule anchoring system, preferably a multi-component inorganic capsule anchoring system, in particular a two-component inorganic capsule anchoring system, which has an excellent mechanical performance, also over a long period of time, and at the same time has increased load values when compared to the known systems and which has advantages, in particular with regard to its direct application within the borehole, to under water applications and to overhead applications as well as with regard to reducing harmful components in an anchoring system.

Moreover, it is an object of the present invention to provide a method for a chemical fastening of anchoring means, preferably of metal anchors, bolts, screw anchors, screw bolts and post-installed reinforcing bars, in mineral substrates, such as structures made of brickwork, concrete, pervious concrete or natural stone, using this inorganic capsule anchoring system.

Also, it is an object to provide the use of an alkali- or alkaline earth-slat based liquid component to activate a powdery ground-granulated blast-furnace slag-based component to furnish sustainability and reduce harmful substances in the area of application of the final inorganic anchoring system.

These and other objectives as they will become apparent from the ensuring description of the invention are solved by the present invention as described below. Preferred embodiments are described further below.

In one aspect, the present invention pertains to a multi-component inorganic capsule anchoring system comprising a curable powdery ground-granulated blast-furnace slag-based component A and an initiator component B in aqueous-phase for initiating the curing process, wherein the powdery ground-granulated blast-furnace slag-based component A comprises further silica dust, and wherein component B comprises an alkali- or alkaline earth-hydroxide, alkali- or alkaline earth-carbonate, or alkali- or alkaline earth-sulfate. This provided system in capsule form is used for chemical fastening of anchoring means in mineral substrates.

In another aspect, the present invention pertains to a method for a chemical fastening of anchors, metal anchors, bolts, screw anchors, screw bolts and post-installed reinforcing bars in mineral substrates, which is characterized in that a multi-component inorganic capsule anchoring system is used for fastening, which comprises a curable powdery ground-granulated blast-furnace slag-based component A and an initiator component B in aqueous-phase for initiating the curing process, wherein the powdery ground-granulated blast-furnace slag-based component A comprises further silica dust, and wherein component B comprises alkali- or alkaline earth-hydroxide, alkali- or alkaline earth-carbonate, or alkali- or alkaline earth-sulfate. The mineral substrates are substrates such as structures made of brickwork, concrete, pervious concrete or natural stone.

In yet another aspect, the present invention pertains to the use of an alkali- or alkaline earth-hydroxide, alkali- or alkaline earth-carbonate, or alkali- or alkaline earth-sulfate based liquid component to activate a powdery ground-granulated blast-furnace slag-based component.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "binder" or "binder component" in the context of the present invention refers to the cementitious constituent and other additional optional components, such as for example fillers of the multi-component inorganic capsule anchoring systems. In particular, this is also referred to as the A component.

The term "initiator" or "initiator component" in the context of the present invention refers to the aqueous alkali- or alkaline earth-hydroxide, alkali- or alkaline earth-carbonate, or alkali- or alkaline earth-sulfate based component, which triggers stiffening, solidification and hardening as a subsequent reaction. In particular, this is also referred to as a B component.

It has been surprisingly found out by the inventors, that the inorganic capsule anchoring system according to the present invention is an easy to handle ready-for-use system for a chemical fastening of anchors, metal anchors, bolts, screw anchors, screw bolts and post-installed reinforcing bars in mineral substrates, comprising a curable powdery ground-granulated blast-furnace slag-based component A and an initiator component B, especially when applied over a long period of time, and overhead. Further, this inorganic capsule anchoring system is particularly suitable for fire-resistant and high-temperature applications as well as for under water applications, e.g. for the installation of oilrigs.

Moreover, it has been found that the multi-component inorganic capsule anchoring system of the present invention, in particular a two-component inorganic capsule anchoring system, allows for an easy application and fastening directly within the borehole without having to premix the components before introducing them into the borehole. When applied under water for example, the components of the inserted capsule are mixed by introducing the anchor rod into the borehole, the water surrounding the capsule is driven out and allows the anchor rod to be fastened.

Further, it has been found that the multi-component inorganic capsule anchoring system of the present invention contains a reduced amount of harmful substances whilst maintaining the standard for chemical anchoring applications. In particular, the use of an alkali-silicate to activate the powdery ground-granulated blast-furnace slag cement is not needed, and activation and hardening can be initiated by the use of an alkali- or alkaline earth-hydroxide, alkali- or alkaline earth-carbonate, or alkali- or alkaline earth-sulfate only, preferably a metal hydroxide.

Further, it has been found that the multi-component inorganic capsule anchoring system of the present invention is capable of reducing harmful substances, e.g. cancerogenic, toxic, mutagenic or environmentally hazardous substances, in the anchoring system, such as peroxides, reactive diluents and resins, in order to improve the handling safety in production and for operators. Additionally, it has been found that the use of ground-granulated blast-furnace slag is more sustainable compared to using common Portland cements and has also a lower carbon footprint than synthetic resins.

Therefore, the present invention pertains to a multi-component inorganic capsule anchoring system comprising a curable powdery ground-granulated blast-furnace slag-based component A and an initiator component B in aqueous-phase for initiating the curing process, wherein the powdery ground-granulated blast-furnace slag-based component A comprises further silica dust, and wherein component B comprises an alkali- or alkaline earth-hydroxide, alkali- or alkaline earth-carbonate, or alkali- or alkaline earth-sulfate.

Component A as used in the present invention is based on ground-granulated blast-furnace slag. The ground-granulated blast-furnace slag preferably comprises from 30 to 45% calcium oxide (CaO), from 30 to 45% silicon dioxide ($SiO_2$), from 1 to 15% aluminum oxide ($Al_2O_3$) and from 4 to 17% Magnesium oxide (MgO), and 0.5 to 1% sulfur(S). Further characteristic contents of the ground-granulated blast-furnace slag are ferric oxide ($Fe_2O_3$), sodium oxide ($Na_2O$), potassium oxide ($K_2O$), chloride, sulfur trioxide ($SO_3$) and manganese oxide ($Mn_2O_3$), which preferably represent less than 5% of the ground-granulated blast-furnace slag.

Component A as used in the present invention comprises at least about 5 wt.-%, preferably at least about 10 wt.-%, more preferably at least about 20 wt.-%, most preferably at least about 30 wt.-%, from about 5 wt.-% to about 80 wt.-%, preferably from about 10 wt.-% to about 70 wt.-%, more preferably from about 20 wt.-% to about 60 wt.-%, most preferably from about 30 wt.-% to about 50 wt.-% of ground-granulated blast-furnace slag, based on the total weight of component A.

Further, component A as used in the present invention further comprises silica dust. The silica dust of the multi-component inorganic capsule anchoring system is present in a range of from 1 wt.-% to 10 wt.-%, preferably from 2 wt.-% to 8 wt.-%, most preferably in a range of from 4 wt.-% to 6 wt.-%, based on the total weight of component A. Preferably, the silica dust has an average particle size of 0.4 microns and a surface area of 180,000 to 220,000 cm$^2$/g or 18-22 m$^2$/g, respectively.

Alternatively, the silica dust can also be replaced by puzzolanic materials or by materials with puzzolanic properties or by other fine reactive or inert fillers. These include corundum, calcite, dolomite, brick flour, rice peel ash, phonolite, calcined clay and metakaolin.

In a preferred embodiment of the cementitious multi-component mortar system, the silica dust is present in a range of 3 wt.-% to 7 wt.-%, based on the total weight of the binder.

Component A may additionally comprise a mineral filler. The mineral filler comprised in component A according to the present invention is selected from the group consisting of limestone fillers, sand, quartz, corundum, dolomite, crushed stones, gravels, pebbles and mixtures thereof, preferred are limestone fillers, coarse quartz, quartz powder, preferably quartz powder having an average grain size (d50%) of about 16 µm, quartz sand, quartz flour, clay, fly ash, fumed silica, carbonate compounds, such as various calcium carbonates, aluminas, pigments, titanium oxides, light fillers, corundum, and their mixtures. Suitable mineral fillers are commercially available products. Exemplarily mentioned is quartz powder Millisil W12 or W6 (Quarzwerke GmbH, Germany), quartz sand F32 (Quarzwerke GmbH, Germany), or Sewper Aggregates, such as SewperCoat® (Imerys, France). Component A comprises at least about 5 wt.-%, preferably at least about 10 wt.-%, more preferably at least about 20 wt.-%, still more preferably at least about 25 wt.-%, most preferably at least about 30 wt.-%, from about 5 wt.-% to about 95 wt.-%, preferably from about 10 wt.-% to about 70 wt.-%, more preferably from about 20 wt.-% to about 60 wt.-%, still more preferably from about 25 wt.-% to about 50 wt.-%, most preferably from about 30 wt.-% to about 40 wt.-% of mineral filler, based on the total weight of component A.

The mineral filler that can be used according to the present invention, is comprised in the powdery ground-granulated blast-furnace slag-based component A of the multi-component inorganic capsule anchoring system. The addition of the mineral filler lowers the consumption of more expensive binder material and improves some properties of the mixed material, results in an increase of load values and eases overhead and under water applications when the multi-component inorganic capsule anchoring system is in form of a two-component inorganic capsule anchoring system.

In an advantageous embodiment, component A as used in the present invention may further comprise the following characteristics, taken alone or in combination.

Component A may also additionally comprise a plasticizer in powder form. The plasticizer comprised in component A may be selected from the group consisting of low molecular weight (LMW) polyacrylic acid polymers, polycondensates, like e.g. sulfonated melamine formaldehydes, lingosulfonates, caseins, superplasticizers from the family of polyphosphonate polyox and polycarbonate polyox, and superplasticizers from the polycarboxylate ether family, and mixtures thereof, for example Melflux 4930 F or Melflux 5581 F (BASF Construction Solutions GmbH), Peramin SMF or Peramin CONPAC (Imerys Aluminates). Suitable plasticizers are commercially available products. Component A may comprise at least about 0.2 wt.-%, preferably at least about 0.3 wt.-%, more preferably at least about 0.4 wt.-%, most preferably at least about 0.5 wt.-%, from about 0.2 wt.-% to about 10 wt.-%, preferably from about 0.3 wt.-% to about 5 wt.-%, more preferably from about 0.4 wt.-% to about 4 wt.-%, most preferably from about 0.5 wt.-% to about 2 wt.-% of said plasticizer, based on the total weight of component A.

Furthermore, component A may contain other cements, such as calcium aluminate-based or calcium sulfoaluminate based cement or Portland cement. Furthermore, component A may contain fibers, such as mineral fibers, man-made fibers, natural fibers, synthetic fibers, fibers of natural or synthetic polymers, fibers of inorganic substances, in particular carbon fibers or glass fibers.

The presence of mineral filler, accelerator, plasticizer in powder form does not change the overall inorganic nature of the cementitious-like component A.

Component B as used in the present invention comprises an alkali- or alkaline earth-hydroxide, alkali- or alkaline earth-carbonate, or alkali- or alkaline earth-sulfate component, such as lithium hydroxide, sodium hydroxide, potassium hydroxide, calcium hydroxide, magnesium hydroxide, lithium carbonate, sodium carbonate, potassium carbonate, potassium sulfate, sodium sulfate, or mixtures thereof or aqueous solutions thereof. Preferably, component B comprises potassium hydroxide, most preferably as an aqueous solution of 10 mol/l KOH.

In a preferred embodiment of the present invention, the alkali- or alkaline earth-hydroxide, alkali- or alkaline earth-carbonate, or alkali- or alkaline earth-sulfate component comprises from 1 to 50 wt.-% alkali- or alkaline earth-hydroxide, alkali- or alkaline earth-carbonate, or alkali- or alkaline earth-sulfate, preferably 10 to 40 wt.-%, most preferably 15 to 30 wt.-%, based on the total weight of the initiator component.

The initiator component comprises at least about 0.01 wt.-%, preferably at least 0.02, particularly preferably at least about 0.05 wt.-%, particularly preferably at least 1 wt.-%, of about 0.01 to about 40 wt.-%, preferably from about 0.02 to about 35 wt.-%, more preferably from about 0.05 to about 30 wt.-%, particularly preferably from about 1 to about 25 wt.-% of the alkali- or alkaline earth-hydroxide, alkali- or alkaline earth-carbonate, or alkali- or alkaline earth-sulfate, based on the total weight of component B.

Component B as used in the present invention may comprise optionally a plasticizer. The optionally plasticizer comprised in component B of the present invention is selected from the group consisting of low molecular weight (LMW) polyacrylic acid polymers, polycondensates, like e.g. sulfonated melamine formaldehydes, lingosulfonates, caseins, superplasticizers from the family of polyphosphonate polyox and polycarbonate polyox, and superplasticizers from the polycarboxylate ether family, and mixtures thereof, for example Ethacryl™ G (Coatex, Arkema Group, France), Acumer™ 1051 (Rohm and Haas, U.K.), Sika® ViscoCrete®-2520 (Sika, Germany) or Sika® ViscoCrete®-20 HE (Sika, Germany). Suitable plasticizers are commercially available products.

Component B comprises at least about 2 wt.-%, preferably at least about 5 wt.-%, more preferably at least about 10 wt.-%, most preferably at least about 15 wt.-%, from about 2 wt.-% to about 40 wt.-%, preferably from about 5 wt.-% to about 35 wt.-%, more preferably from about 10 wt.-% to about 30 wt.-%, most preferably from about 15 wt.-% to about 25 wt.-% of said plasticizer, based on the total weight of component B.

Furthermore, at least one filler or filler mixtures may be present in the initiator component. These are preferably selected from the group consisting of quartz, sand, quartz flour, pigments, titanium oxides, light fillers, limestone fillers, corundum, dolomite, alkali-resistant glass, crushed stones, pebbles and mixtures thereof.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B may comprise at least about 0.01 wt.-%, preferably at least about 0.05 wt.-%, more preferably at least about 0.1 wt.-%, most preferably at least about 0.2 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.2 wt.-% to about 1 wt.-% of said thickening agent, based on the total weight of component B.

Component B may further comprise an antibacterial or biocidal agent. The antibacterial or biocidal agents which can be used in the present invention may be selected from the group consisting of compounds of the isothiazolinone family, such as methylisothiazolinone (MIT), octylisothiazolinone (OIT) and benzoisothiazolinone (BIT) and their mixtures.

The presence of a plasticizer, thickening agent, filler antibacterial or biocidal agent and/or accelerator in liquid form does not change the overall inorganic nature of the component B.

Component B is present in aqueous phase, preferably in form of a liquid. In an alternative embodiment, component B may also be present in form of a slurry or paste.

The weight ratio between component A and component B (A/B) is preferentially comprised between 8/1 and 1/3, preferably is 4.5/1. Preferably, the composition of the mixture comprises 82 wt.-% of component A and 18 wt.-% of component B. In an alternative embodiment, the composition of the mixture comprises 25 wt.-% of component A and 75 wt.-% of component B.

It is preferred that the multi-component inorganic capsule anchoring system has an initial set-time of at least 1 min, preferably of at least 2 min, more preferably of at least 3 min, most preferably of at least 5 min, in particular in the range of from about 5 to 25 min, preferably in the range of about 5 to 20 min, after mixing of the two components A and B.

In the multi-component inorganic capsule anchoring system, especially the two-component inorganic capsule anchoring system, the volume ratio of cementitious component A to component B is 3.2:1 to 1:1, preferably is 2:1. In an alternative embodiment, the volume ratio of cementitious component A to component B is 1:2 to 1:7.

The multi-component inorganic anchoring system is preferably a ready-for-use system, whereby component A and B are in a multi-chamber device, such as a multi-chamber cartridge, a multi-chamber cylinder and/or a multi-chamber capsule, preferably a two-component capsule. In particular, the two-component inorganic capsule anchoring system includes two foil bags for separating curable component A and initiator component B. In an alternative embodiment, the two-component inorganic capsule is made of glass or paper. The two-component inorganic capsule can also be referred to as capsule-in-capsule, foil-in-foil or glass-in-glass. The contents of the capsules are mixed together by inserting the inorganic anchoring system into the borehole, introducing the anchoring device thereby destroying the capsule and mixing component A and B directly within the borehole ready for setting and chemically fastening the anchoring means.

In particular, the multi-component inorganic capsule anchoring system is to be considered as a chemical anchor for fastening anchoring means, such as metal anchors, bolts, screw anchors, screw bolts and post-installed reinforcing bars or the like into mineral substrates, such as structures made of brickwork, concrete, pervious concrete or natural stone. It is preferred that the multi-component inorganic capsule anchoring system is used for fastening anchor rods in boreholes.

Moreover, the multi-component inorganic capsule anchoring system may be used for the attachment of fibers, scrims, fabrics or composites, in particular of high-modulus fibers, preferably of carbon fibers, in particular for the reinforcement of building structures, for example walls or ceilings or floors, or further for mounting components, such as plates or blocks, e.g. made of stone, glass or plastic, on buildings or structural elements. A particular use case could be the fixing of fire boards. However, in particular it is used for fastening of anchoring means, preferably metal anchors and post-installed reinforcing bars, such as anchor rods, in particular threaded rods, bolts, steel reinforcement bars or the like into recesses, such as boreholes, in mineral substrates, such as structures made of brickwork, concrete, pervious concrete or natural stone, whereby the components of the multi-component inorganic capsule anchoring system are mixed, for example by destroying the capsule or a plastic/film bag.

The inventive multi-component inorganic capsule anchoring system preferably is contained separately in a two-chamber capsule so as to inhibit reaction and can be caused to react under use conditions. Moreover, the component A and the component B are produced separately from each other, so that the one component usually contains the curable powdery cement, while the other component contains the initiator component B including the alkali- or alkaline earth-hydroxide, alkali- or alkaline earth-carbonate, or alkali- or alkaline earth-sulfate component. The fillers, as well as the remaining components, may be contained in the one or also the other component.

The two-chamber and multi-chamber systems, in which the inventive, multi-component inorganic capsule anchoring system is present, include especially cartridges of glass, plastic, plastic sheets, metallic foils or ceramic, in the interior of which the curable component is kept separate from the initiator component agent by walls, which can be destroyed. Such cartridge or capsule systems are placed in the boreholes. To initiate the curing reaction, the cartridges or capsules, including the partitions contained therein, are destroyed, for example, by driving anchoring means, such as a tie bar, into them.

The following example illustrates the invention without thereby limiting it.

EXAMPLES

There are only one-component inorganic capsule systems known, which have to be immersed in water to be ready for using their content for chemical fastening. These are not suitable for overhead and under water applications, they are not easy to handle and to portion. These one-component systems are for example Denka Quick capsules (Denka Co. Ltd., Japan) or Ambex systems from Ambex Concrete Repair Solutions, Canada. Other known two-component systems have to be pre-mixed outside of the borehole and require several additional tools and working steps, e.g. Cemeforce (Sumitomo Osaka Cement Co. Ltd., Japan).

1. Composition of the Ground-Granulated Blast-Furnace Slag

TABLE 1

RFA-analysis slag.

| | Slag Name | H4000 | H12000 |
|---|---|---|---|
| Oxides [M.-%] (RFA) | $SiO_2$ | 38.1 | 38.51 |
| | $Al_2O_3$ | 9.89 | 10.02 |
| | $Fe_2O_3$ | 0.41 | 0.41 |
| | CaO | 40.33 | 39.68 |
| | MgO | 5.68 | 5.79 |
| | $SO_3$ | 2.74 | 2.74 |
| | S | 1.12 | 1.10 |
| | $Na_2O$ | 0.41 | 0.42 |
| | $K_2O$ | 0.74 | 0.75 |
| | $Mn_2O_3$ | 0.58 | 0.57 |
| | Cl | 0.01 | 0.01 |
| Fineness of slag in $cm^2/g$ (Blaine) | | 4000 | 12000 |
| Size distribution (µm) | | 0.1-100 | 0.1-10 |

2. Preparation of Component a and Component B

The powdery cementitious component A as well as the liquid initiator component B of the examples are initially produced by mixing the constituents specified in Tables 2 and 3, respectively, with those specified in Table 4. The proportions that are given are expressed in wt.-%. The constituents of component A were mixed with the help of a Turbula shaker mixer for 1 hour until the mix was fully mixed until free of clumps.

TABLE 2

Composition of component A based on ground-granulated blast-furnace slag [wt.-%].

| | Binder H4000 | Binder H12000 | Binder Silica dust[1] | Filler Sand[2] | Filler Quartz-powder[3] |
|---|---|---|---|---|---|
| A0 | 34.5 | | 7.5 | 50 | 8 |
| A1 | | 34.5 | 7.5 | 50 | 8 |

[1]Silica dust: finess in $cm^2/g$ (Blaine) 180.000-220.000; size distribution (µm) 0.1-10.
[2]Sand: size distribution (µm) 125-1000.
[3]Quartz powder: size distribution (µm) 0.1-100.

A 10 M KOH solution was prepared by weighing out 56 g of KOH pellets in a beaker to which was added approximately 75 ml of water. The KOH solution was mixed with a magnetic stirrer until all the KOH had dissolved. The solution was left to cool before being transferred to a 100 mL volumetric flask. Deionised water was added so that the final solution had a volume of 100 ml. Component B was finalised by mixing in equal weight the 10 M KOH solution with water, according to Table 3. The higher amount of B in A1 is to compensate for the increased water demand due to increased fineness of the slag.

TABLE 3

Composition of component B (wt.-%).

| | Initiator KOH 10 mol/l | Initiator Water |
|---|---|---|
| B | 50 | 50 |

TABLE 4

Mixing ratio of component A to component B.

| Component A | Component B | A/B-Ratio | Water/Binder Ratio |
|---|---|---|---|
| A0 | B | 5 | 0.38 |
| A1 | B | 4 | 0.48 |

3. Determination of Mechanical Performance-Inner Sleeve Test

After being produced separately, the powdery binder component A and initiator component B are mixed mechanically mixed for 2 minutes until the mortar is smooth and can flow. The mortars are transferred into a one-component plastic hard cartridge. The cartridges are transferred into a cartridge dispenser and the mortars are dispensed into 5 steel sleeves into which small wooden dowels were previously inserted as to fix the anchoring depth at 28 mm. An 8×110 mm threaded rod (M8) is inserted into each of the steel sleeves, pushing the mortar out and around the rod. The excess mortar is removed and the mortar is left to cure for 1 and 7 days. The M8 rods anchored into the steel sleeves are pulled out using a ZWICK 50 KN apparatus. A steel sleeve is screwed into a fixed plate, the M8 rod on top is fixed to the pulling arm. The arm pulled on the anchor at a rate of 0.5 mm/min until a load of 100 N is registered. Thereafter, pulling rate is increased to 3 mm/min until failure. The amount of mortar adhered to the rod was measured to calculate the failure load in $N/mm^2$. Each example consists of a mean value of five pull-outs. Ultimate failure loads are calculated as inner strengths and given in $N/mm^2$ in Table 5.

TABLE 5

Inner strengths in $N/mm^2$.

| Example | Components | Inner strengths in $N/mm^2$ after 1 day of curing | Inner strengths in $N/mm^2$ after 7 days of curing |
|---|---|---|---|
| 1 | A0 + B | 0.82 | 4.42 |
| 2 | A1 + B | 2.40 | 10.83 |

As it can be seen from Table 5, all measurable systems show considerable inner strengths after 24 hours of curing as well as increased load values when curing is prolonged and hence, improved mechanical strength. As it has been shown additionally above, that the use of finely ground binders, in particular with a fineness in a range of 4,000-12,000 $cm^2/g$, provides for an increase in load values and hence mechanical strength.

Both the A0 and A1 formulations show the hydration of the ground-granulated blast-furnace slag such that small loads could be applied after 1 day of curing; A0 had an average bond strength of 0.82 N/mm², whereas A1 had a bond strength of 2.40 N/mm². The higher bond strength of A1 can be explained by the higher fineness of the slag, despite the higher B: A ratio. By the 7$^{th}$ day of curing, the bond strengths increase to 4.42 and 10.3 N/mm² for A0 and A1, respectively. The inventive example shows that hardening of the ground-granulated blast-furnace slag cement can be initiated without an alkali-silicate using solely an alkali- or alkaline earth-hydroxide, alkali- or alkaline earth-carbonate, or alkali- or alkaline earth-sulfate, preferably a metal hydroxide.

In general, the multi-component inorganic capsule anchoring system has an excellent mechanical performance, also over a long period of time, and at the same time high load values, which has advantages, in particular with regard to its direct application within the borehole, in fire conditions and under elevated temperature as well as under water and overhead.

Additionally, the multi-component inorganic capsule anchoring system contains a reduced amount of harmful substances whilst maintaining the standard for chemical anchoring applications. In particular, the use of an alkali-silicate to activate the powdery ground-granulated blast-furnace slag cement is not needed, and activation and hardening can be initiated by the use of an alkali- or alkaline earth-hydroxide, alkali- or alkaline earth-carbonate, or alkali- or alkaline earth-sulfate only, preferably a metal hydroxide.

Further, the multi-component inorganic capsule anchoring system is capable of reducing harmful substances, e.g. cancerogenic, toxic, mutagenic or environmentally hazardous substances, in the anchoring system, such as peroxides, reactive diluents and resins, in order to improve the handling safety in production and for operators, as well as enhancing sustainability and lowering the carbon footprint.

The invention claimed is:

1. A two-component inorganic capsule anchoring system for chemical fastening of anchors, bolts, screw anchors, screw bolts, and post-installed reinforcing bars in mineral substrates, comprising:
   a curable powdery ground-granulated blast-furnace slag-based component A, and
   an initiator component B in aqueous-phase for initiating a curing process,
   wherein the powdery ground-granulated blast-furnace slag-based component A comprises silica dust,
   wherein component B comprises an alkali- or alkaline earth-hydroxide, alkali- or alkaline earth-carbonate, or alkali- or alkaline earth-sulfate component,
   wherein components A and B are present in a capsule and are separated within the capsule to inhibit reaction between components A and B,
   wherein the capsule is a two-component inorganic plastic or foil capsule that is a capsule-in-capsule or foil-in-foil system,
   wherein the A and B components are kept separate by walls or foil bags,
   wherein components A and B react during the chemical fastening, and
   wherein component B does not contain a filler.

2. The two-component inorganic capsule anchoring system according to claim 1, wherein the ground-granulated blast-furnace slag-based component A comprises ground-granulated blast-furnace slag in a range of from about 10 wt.-% to about 70 wt.-%, based on a total weight of component A.

3. The two-component inorganic capsule anchoring system according to claim 1, wherein component A further comprises a mineral filler selected from the group consisting of a limestone filler, sand, quartz, corundum, dolomite, crushed stone, gravel, pebbles, and a mixture thereof.

4. The two-component inorganic capsule anchoring system according to claim 1, wherein component B comprises the alkali- or alkaline earth-hydroxide, alkali- or alkaline earth-carbonate, or alkali- or alkaline earth-sulfate component, which is selected from the group consisting of lithium hydroxide, sodium hydroxide, potassium hydroxide, calcium hydroxide, magnesium hydroxide, lithium carbonate, sodium carbonate, potassium carbonate, potassium sulfate, sodium sulfate, a mixture thereof, and an aqueous solution thereof.

5. The two-component inorganic capsule anchoring system according to claim 1, wherein component B comprises the alkali hydroxide, and wherein the alkali hydroxide is an aqueous solution of potassium hydroxide.

6. The two-component inorganic capsule anchoring system according to claim 1, wherein the A and B components are kept separate by foil bags.

7. The two-component inorganic capsule anchoring system according to claim 1, wherein components A and B are present in a two-component inorganic capsule anchoring system including two foil bags to inhibit reaction between components A and B.

8. The two-component inorganic capsule anchoring system according to claim 1, wherein component A does not include an initiator component.

9. The two-component inorganic capsule anchoring system according to claim 1, which is a foil-in-foil system including two foil bags for separating components A and B.

10. The two-component inorganic capsule anchoring system according to claim 1, which is a plastic capsule-in-capsule system.

11. The two-component inorganic capsule anchoring system according to claim 1, wherein component B consists of the initiator.

12. The two-component inorganic capsule anchoring system according to claim 1, which consists of component A and component B in the capsule.

13. A chemical anchor for chemical fastening of an anchor in a mineral substrate, obtained by mixing component A and component B of the two-component inorganic capsule anchoring system according to claim 1.

14. A method, comprising:
   chemically fastening an anchor or a post-installed reinforcing bar in a mineral substrate, with the two-component multi component inorganic capsule anchoring system according to claim 1.

15. A method of activating a powdery ground-granulated blast-furnace slag-based component for chemical fastening of an anchor in a mineral substrate, comprising:
   mixing an alkali- or alkaline earth-hydroxide, alkali- or alkaline earth-carbonate, or alkali- or alkaline earth-sulfate based liquid component with the powdery ground-granulated blast-furnace slag-based component,
   wherein the components are present in the two-component inorganic capsule anchoring system according to claim 1 and are separated within the capsule to inhibit reaction between components.

16. The method according to claim 15, wherein the alkali- or alkaline earth-hydroxide, alkali- or alkaline earth-carbonate, or alkali- or alkaline earth-sulfate component is selected from the group consisting of lithium hydroxide, sodium hydroxide, potassium hydroxide, calcium hydroxide, magnesium hydroxide, lithium carbonate, sodium carbonate, potassium carbonate, potassium sulfate, sodium sulfate, a mixture thereof, and an aqueous solution thereof.

17. A two-component anchoring system, comprising:

a curable powdery ground-granulated blast-furnace slag-based component A, and an initiator component B in aqueous-phase for initiating a curing process, wherein the powdery ground-granulated blast-furnace slag-based component A comprises silica dust, and wherein component B comprises an alkali- or alkaline earth-hydroxide, alkali- or alkaline earth-carbonate, or alkali- or alkaline earth-sulfate component, wherein components A and B are present in a multi-chamber device and are separated within the device to inhibit reaction between components A and B, wherein components A and B react during the chemical fastening, and wherein the multi-chamber device is a plastic capsule-in-capsule or foil-in-foil, system, and wherein component B does not contain a filler.

18. The two-component anchoring system according to claim 17, wherein the multi-chamber device is a multi-chamber cartridge, a multi-chamber cylinder, and/or a multi-chamber capsule.

19. The two-component anchoring system according to claim 17, wherein component A does not include an initiator component.

20. The two-component anchoring system according to claim 17, which consists of component A and component B in the multi-chamber device.

* * * * *